United States Patent [19]

Moriyama

[11] 4,406,061

[45] Sep. 27, 1983

[54] METHOD AND APPARATUS FOR FASTENING A CONNECTION TERMINAL TO ONE END OF AN INSULATED WIRE

[76] Inventor: Takashi Moriyama, 20303, Uozaki-nishimachi, Higashinada-ku, Kobe 658, Japan

[21] Appl. No.: 251,371

[22] Filed: Apr. 6, 1981

[30] Foreign Application Priority Data

Nov. 11, 1980 [JP] Japan ............................... 55-158404

[51] Int. Cl.³ ........................ H01R 43/04; B23P 19/00

[52] U.S. Cl. ........................................ 29/867; 29/751

[58] Field of Search ................. 29/862, 863, 861, 747, 29/748, 751, 750, 753, 758; 81/9.51, 479, 9.5 R, 9.5 A; 83/521; 339/276 T, 213

[56] References Cited

U.S. PATENT DOCUMENTS

| | | | |
|---|---|---|---|
| 3,044,334 | 7/1962 | Broske | 29/862 X |
| 3,555,672 | 1/1971 | O'Keefe et al. | 29/753 X |
| 3,621,560 | 11/1971 | LeBright | 81/9.51 X |
| 3,656,391 | 4/1972 | Von Arx | 83/521 |

FOREIGN PATENT DOCUMENTS

| | | | |
|---|---|---|---|
| 974387 | 11/1964 | United Kingdom . | |
| 1211485 | 11/1970 | United Kingdom . | |
| 755544 | 8/1980 | U.S.S.R. | 81/479 |

*Primary Examiner*—Howard N. Goldberg
*Assistant Examiner*—Carl J. Arbes
*Attorney, Agent, or Firm*—Merriam, Marshall & Bicknell

[57] ABSTRACT

A tubular cylindrical portion of a connection terminal is held between upper and lower dies by pressure applied using a multi-purpose actuator lever. An end portion of a coated or insulated wire is held between an insert slider and a holder and is advanced toward an open end of the cylindrical portion of the connection terminal, through the use of an insert lever. The core wire is pressed into the cylindrical portion while its surrounding insulation is compressed and pushed back by engagement with the end portion of the cylindrical portion. The multi-purpose actuator lever is moved to crimp the cylindrical portion on the core wire. Then, the actuator lever is turned to separate the upper and lower dies. The wire is then withdrawn and the compressed insulation is moved to cover the cylindrical portion.

12 Claims, 10 Drawing Figures

METHOD AND APPARATUS FOR FASTENING A CONNECTION TERMINAL TO ONE END OF AN INSULATED WIRE

BACKGROUND OF THE INVENTION

This invention relates to a method and apparatus for attaching a connection terminal to an electric wire having an insulation coating thereon, such as a plastic or rubber-coated cable.

The conventional way to tightly secure a connection terminal to an end of an electric wire having an insulation coating involves cutting and removing the coating for a predetermined distance from the end of the insulated wire by means of a knife or a wire stripper, inserting the bared wire into a tubular cylindrical portion of the connection terminal, crimping tightly the cylindrical portion by the use of pliers or the like and, if necessary, covering the cylindrical portion of the connection terminal and the electric wire with an insulating tube of the heat-shrinkable type or with an insulating tape. In such case, while it is necessary to cut the insulation coating from the end of the wire, it is disadvantageous because the core wire may often be impaired. Many improvements in this regard have been proposed in the construction of wire strippers, which improvements were however incomplete because they did not face the difficulty of inserting the core wire inside the hole of the cylindrical portion of the connection terminal when part of the insulation remains or when the core wire is shifted or deformed. Thus, installation of the connection terminal has not been fully simplified.

Some approaches to permit installation of the connection terminal without cutting the insulation have been made by moving the portion of the insulation coating at the end of the wire so as to expose the core wire. Those approaches generally include means for fastening the electric wire and means slidable with respect to the fastening means for gripping the insulation coating, whereby the insulation is so moved backwardly with respect to the core wire as to expose the end of the core wire. However, smooth relative movements are difficult to attain between the core wire and the coating, and the apparatus for gripping and sliding the coating is bulky and of large size. Another serious problem is that the connection terminal has to be conveyed to another location for installation on the core wire after the wire has been bared.

OBJECT OF THE INVENTION

It is a primary object of the present invention to provide method and apparatus for fastening a connection terminal to an end portion of a coated electric wire through a set of sequential and continuous steps, and a device for providing mechanical controls for the respective components used in carrying out said method.

More particularly, in this aspect, the primary object of the present invention is to effect the exposure of a core wire and the fixing of the connection terminal in a continuous fashion in a minimum number of steps.

It is another object of the present invention to achieve a sequence of procedures for installation of a connection terminal on a wire by using, in combination, dies for gripping and compressing a cylindrical portion of a connection terminal, insert means for thrusting an end portion of an electric wire toward the cylindrical portion of the connection terminal and thus inserting a core wire into the cylindrical portion, return means for returning in a direction opposite the direction of thrust the electric wire to which the connection terminal is fastened and restore means for restoring a compressed coating over the cylindrical portion of the connection terminal.

It is still another object of the present invention to achieve the foregoing sequence of steps by constructing some of said means to provide more than one function, some of said means including an insert lever and a multipurpose actuator lever which are operated in a continued fashion.

Other objects of the present invention are to provide apparatus which is simple in construction and reliable in operation, maintains constant pressure necessary for compressing the connection terminal and insures easy and stable insertion of the core wire of the electric wire into the cylindrical portion of the connection terminal even when the wire is deflected.

In the following description, preferred embodiments of the present invention are described in further detail, but the following specific examples are not intended to limit the scope of the present invention thereto.

DETAILED DESCRIPTION OF THE INVENTION

While the following detailed description includes references to the locations of parts relative to other parts in a figure of the drawings, such as front or back, above or below, and similar references to directions of movement, it will be understood that such references are used only to facilitate the description of the parts, since the apparatus described may have various orientations before and during use.

Figure 1:
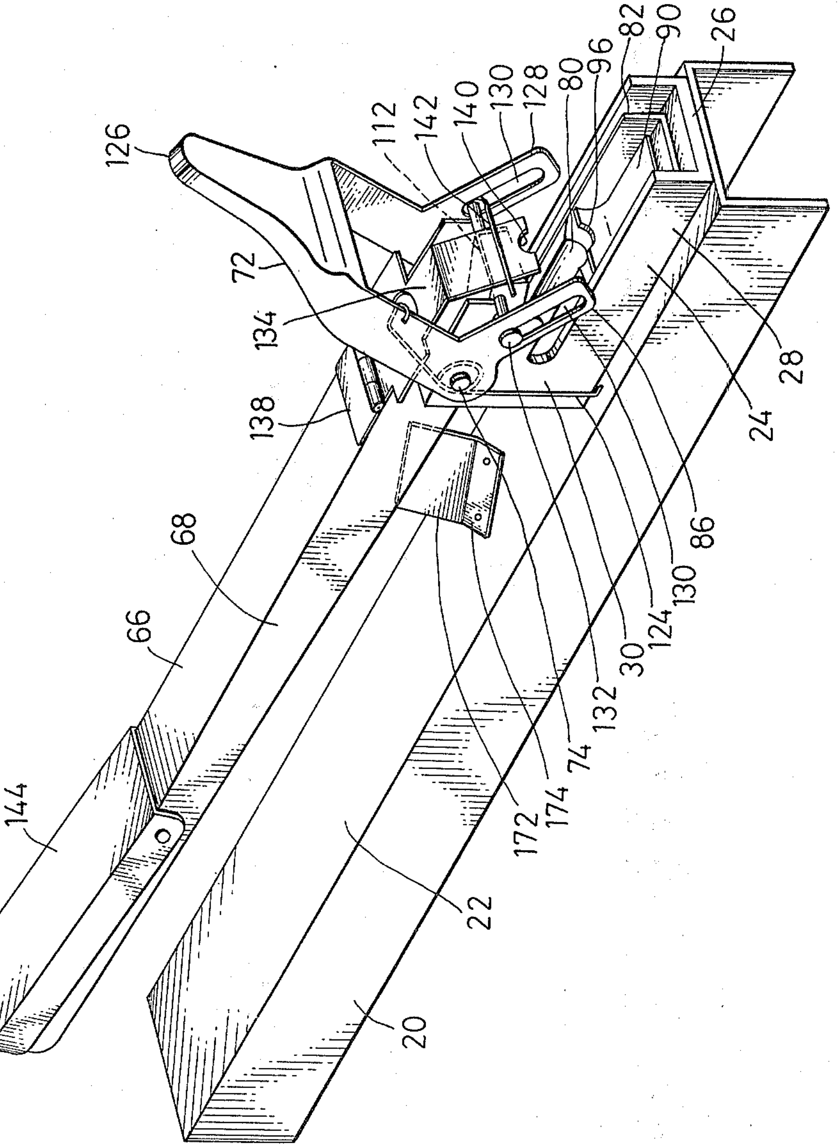
FIG. 1 is a perspective view showing a first embodiment of the present invention mounted on an assembly base board.
Figure 2:
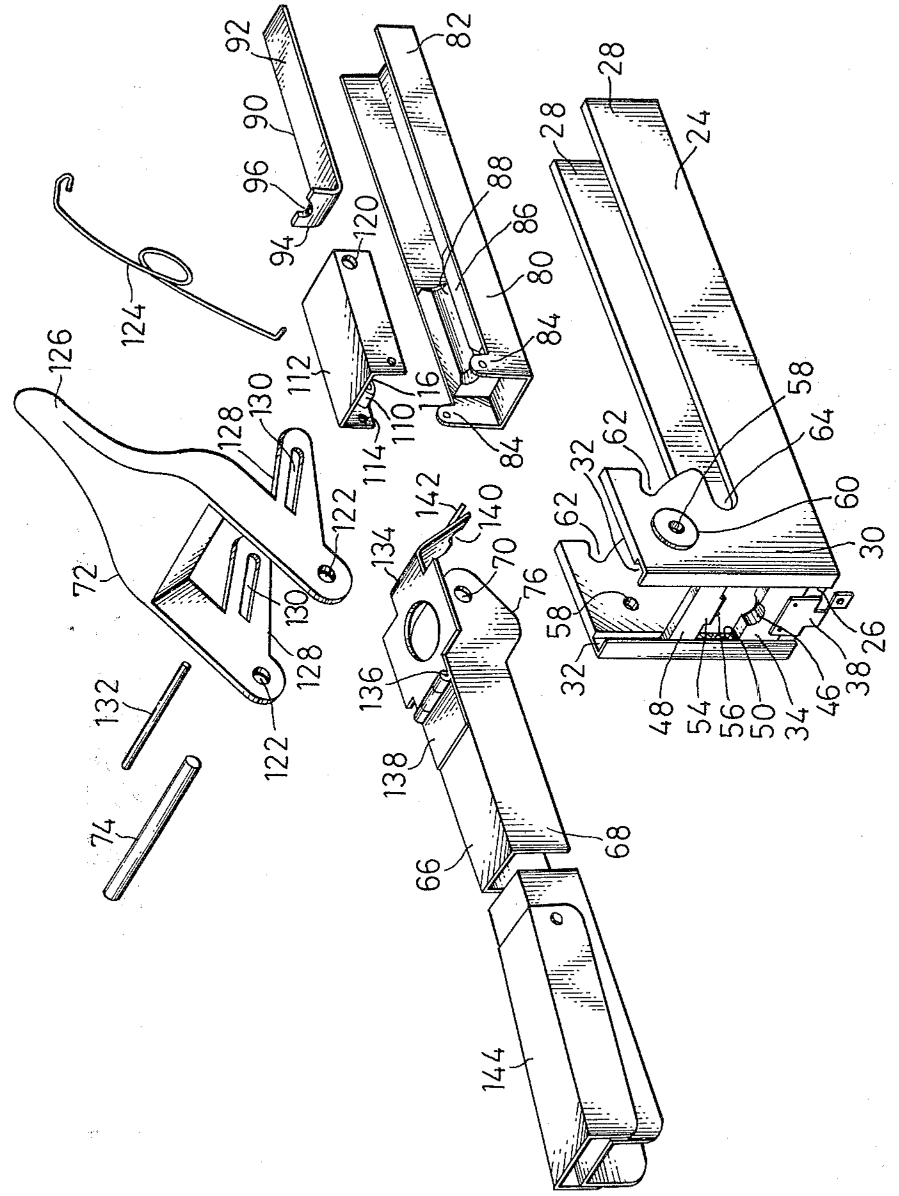
FIG. 2 is an exploded perspective view of the parts except for the assembly base board.

Referring now to FIGS. 1 to 9, there is shown a first embodiment of the present invention, wherein an assembly base board 20 is provided having an inverted channel configuration. Mounted on a top wall 22 adajcent one end of the base board 20 is an actuator base board 24 which extends along the length of the top wall 22, the backward end of the base board 24 being on the right side as seen in FIGS. 1 and 2.

The actuator base board 24 also has a channel configuration with an upwardly oriented opening. The board 24 includes bottom wall 26 and opposed side walls 28 which serve as a slide guide adjacent the backward end. The front end of the actuator base board extends vertically upwardly to form a pair of lever-supporting side plates 30, with the front end forming a die mount.

Within the die mount are formed vertically elongated slide grooves 32 on the inner surfaces of the side plates 30, which face each other. A lower die 34 is pivoted below the slide grooves 32, by means of two shaft portions 36 (FIGS. 3-7) which extend laterally outwardly from the lower side of the die 34. An arm 38 fastened to the forward side of the lower die 34 extends downwardly through an aperture 40 (FIG. 3) in the wall 22 of the base board 20, and it is biased in the counterclockwise direction to a vertical position about the shaft portions 36 by means of a spring 44 which extends between the lower end of the arm 38 and a stationary pin 42. It should be noted that the pivoting movement of the arm 38 is restricted to the vertical position by the forward side of the slide groove 32 which the arm 38 contacts. A semi-circular groove 46 is formed in the top horizontal surface of the lower die 34.

An upper die 48 extends across the slide grooves 32 and is slidable in a vertical direction above the lower die 34. The upper die 48 is biased vertically upwardly by two return springs 50 mounted within the slide grooves 32, with the span of its upward movement being limited by two stops formed within the grooves 32. The upper die 48 has a downwardly oriented projection 54 extending from the center of its bottom side, the lower end of the projection being rounded (see FIG. 3) and forming a spit 56.

The side plates 30 are provided with aligned bearing holes 58 rearwardly of the slide grooves 32 and above the stops 52, and a disc-shaped washer 60 is affixed in each of the bearing holes. Furthermore, slots 62 and 64 are formed in the rearward edges of the side plates 30.

A multi-purpose actuator lever 66 having a channel configuration is provided with bearing holes 70 in the right-hand ends (as seen in FIG. 2) of both of its side plates 68. The lever 66 is pivotally mounted on the baseboard 24 by a pin or shaft 74 (FIG. 1) that extends through the holes 58 and 70. Provided on the peripheries or edges of the side plates 68 of the lever 66 adjacent its pivoted end are arcuate cam projections 76 (FIG. 2) which have a gradually varying distance from the bearing holes 70. When the multi-purpose actuator lever 66 is pivoted counterclockwise forwardly and downwardly, the cam projections 76 engage the top edge of the upper die 48 and urge it downwardly. The cam projections are preferably reinforced by a reinforcing member 78 (FIGS. 3-7) that extends between the side plates 68 and is secured to the lever 66.

Slidably received within the channel defined by the bottom wall 26 and the side walls 28 of the actuator base board 24 is a channel-shaped insert slider 80 (FIG. 2) which is somewhat shorter than the actuator base board 24. The insert slider 80 includes side walls 82 that have bearing holes 84 formed in the forward and upper corners. A lower electric wire holder 86 is secured adjacent the forward end and between the side plates 82 and the holder 86 has on its upper side an elongated groove 88 having a semi-circular cross section for receiving a round electric wire. The rearward end of the channel of the insert slider 80 serves as a slide guide wherein a return slider 90 is slidably received. The forward end of a horizontal segment 92 of the return slider 90 is upwardly bent to constitute a vertical segment 94 (FIG. 2), the upper edge of which is provided with a semi-circular groove 96 for receiving an electric wire.

It is preferable that the insert slider 80 and the return slider 90 be spring-coupled within the opening of the base board 20. To this end a bolt 100 (FIG. 3) is screwed into the bottom of the insert slider 80 and extends through elongated slots 98 formed in the bottom walls of the actuator base board 24 and the assembly base board 20. Another bolt 104 is screwed into the bottom of the return slider 90 and extends through elongated holes 102 formed in the insert slider 80, the actuator base board 24 and the assembly base board 20. A tension spring 106 extends between the bolts 100 and 104. A compression spring 108 (FIG. 3) is wound about the bolt 100 and engages the bottom of the wall 22 and permits stable and smooth sliding movement of the insert slider 80 in the slide groove in the actuator base board 24.

An upper electric wire holder 112 consisting of an upper half 110, which forms a pair with the lower half 86, is pivotally mounted above the lower half 86. Pivot holes 114 (FIG. 2) are formed in its forward end, which are aligned with the bearing holes 84 in the insert slider 80, and a pin connects the parts. The bottom side of the upper half 110 is formed with an elongated groove 116 having a semi-circular cross section for receiving an electric wire, the groove 116 being in alignment with the groove 88 in the lower half 86 for holding a coated or insulated electric wire 118 therebetween. The rearward end of the pivotable upper holder 112 is provided with pin holes 120.

A fork-shaped insert lever 72 serves to actuate the insert slider 80 and the upper holder 112 and has bearing holes 122 formed in the forward ends of the arms of the fork. The insert lever 72 is also pivotable about the bearing holes 58, together with the multi-purpose actuator lever 66, by the pin shaft 74. In addition, the insert lever is biased in its return or counterclockwise direction by a torsion coil spring 124 wound around the periphery of the disc-shaped washer 60. The insert lever 72 is further provided with arm portions 128, which are formed near the forward ends of the fork and which extend rearwardly in a direction substantially normal to its pressure portion 126. The arm portions 128 are provided with elongated straight slots 130 which form a cam. A movable pin 132 is inserted through the slots 130 and into the pin holes 120 in the pivotable upper holder 112, so as to operatively connect the upper holder 112 to the insert lever 72.

Figure 3:
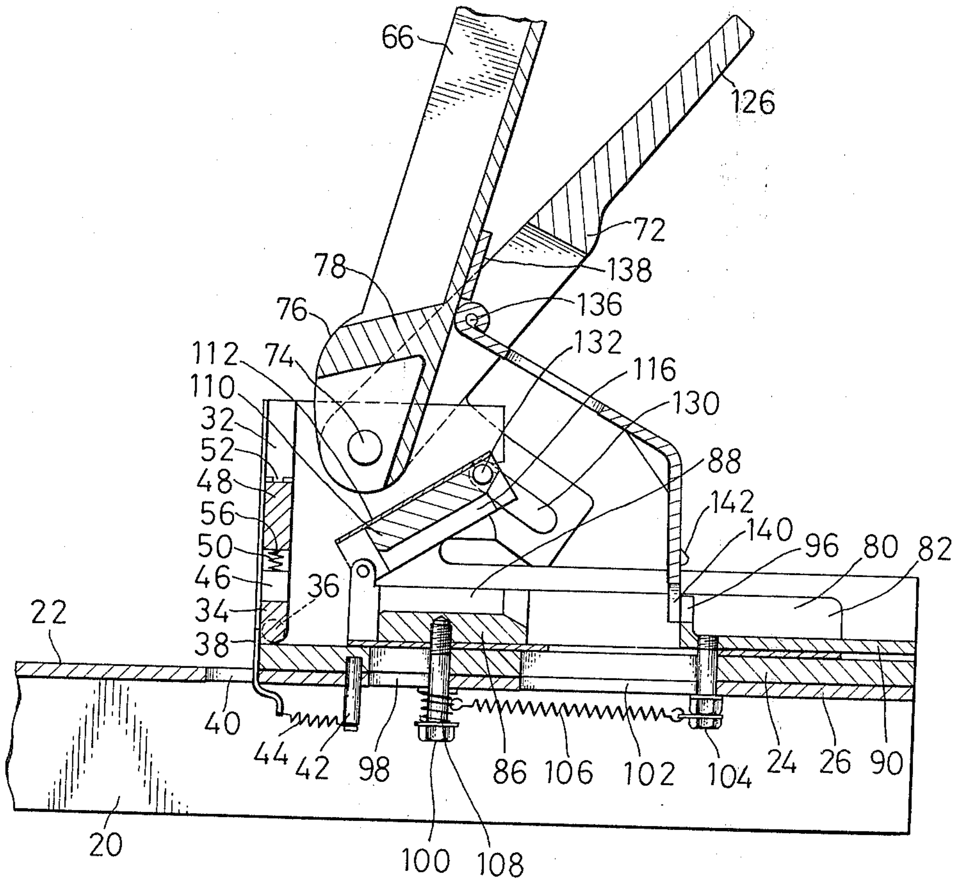
FIGS. 3, 4, 5, 6 and 7 are elevational cross-sectional views showing operational steps while fastening a wire to a connection terminal using the apparatus of the first embodiment.
Figure 4:
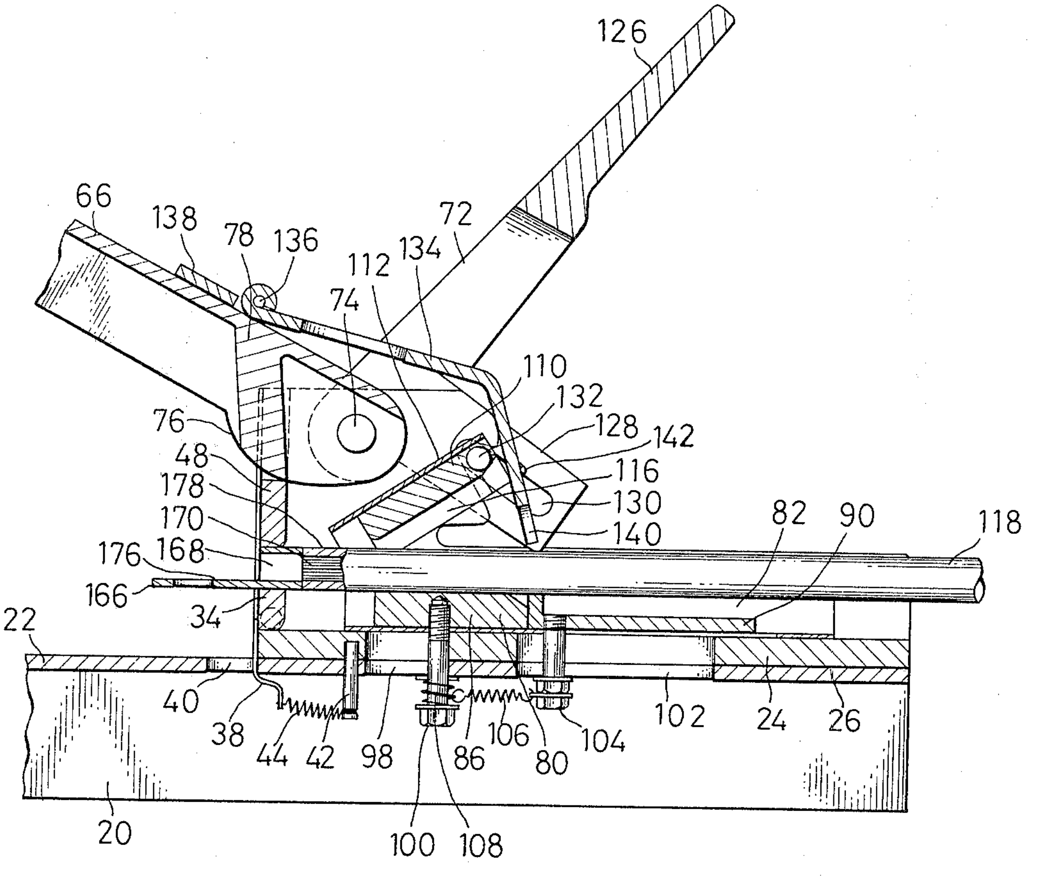

When the insert lever 72 is moved to the vertical position due to the action of the torsion coil spring 124, as shown in FIGS. 1, 3 and 4, the movable pin 132 slides to the upper end of the elongated grooves 130. This action pivots the upper holder 112 about the pivot holes 114 in a direction to lift and open its back side. When the pressure portion 126 of the insert lever 72 is pressed down under these circumstances, the movable pin 132 slides to the lower ends of the elongated slots 130 and, due to the weight of the holder 112 and the movable pin 132, the holder 112 pivots clockwise on the insert slider 80 to a position where the wire-receiving grooves 88 and 116 are in alignment and the movable pin 132 rests on the upper edges of the side walls 28 of the actuator base board 24. When the insert lever 72 is further pivoted in the clockwise direction, the movable pin 132 is moved toward the dies 48 and 34, guided by the elongated grooves 130 and the side walls 28. At the same time the insert slider 80 and the upper holder 112 advance toward the dies 48 and 34. The forward movement of the movable pin 132 is limited by the slots 64, while the returning or counterclockwise movement of the insert lever 72 is limited by the slot 62 which the pin 132 enters as shown in FIG. 3.

A return device is also provided which cooperates with the return slider 90 and includes a pressure arm 134 that is pivoted on the compound actuator level 66 by a hinge 136 and a mounting plate 138 (FIG. 2). The pressure arm 134 extends rearwardly above the upper holder 112, and it bends at its intermediate point with its rearward end angled toward the return slider 90. Provided at this rearward end are a semicircular groove 140 (FIG. 1) for depressing an electric wire and a laterally extending slide pin 142 that is slidable on the upper edges of the side walls 28 of the actuator base board 24.

Figure 5:
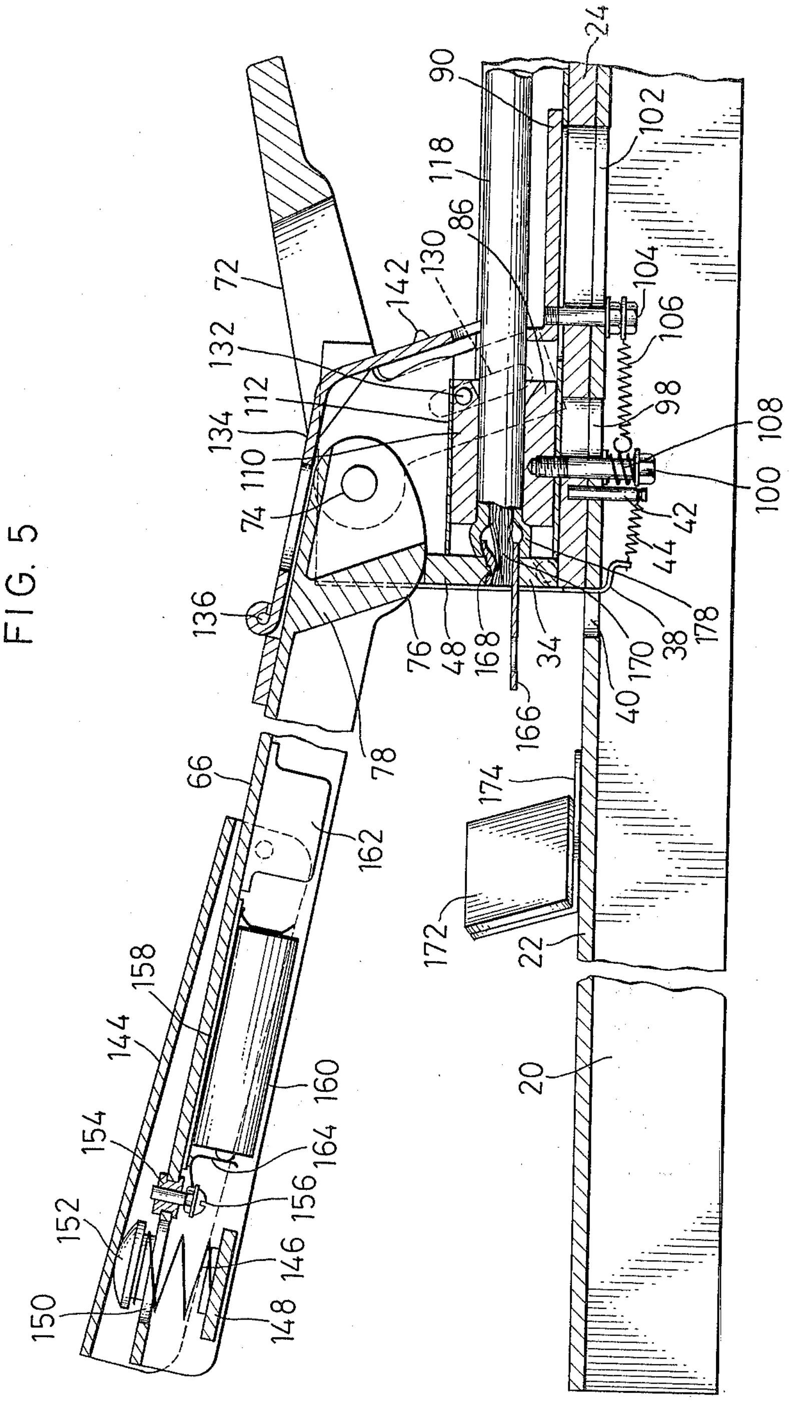

Alarm means are incorporated on the forward end of the multi-purpose actuator lever 66 (see FIG. 5). An inverted channel-shaped cover 144 made of an electrically conductive material overlies the forward end of the multi-purpose actuator lever 66. The cover is pivotally attached to the lever 66 at its rearward end and a compression spring 146 is disposed between the forward or free end of the cover 144 and the multi-purpose actuator lever 66. The lower end of the spring 146 is secured to a spring support 148 that extends between the opposite side walls of the actuator lever 66, while the upper end of the spring engages a terminal 152 that passes through an aperture 150 formed in the lever 66. The terminal 152 abuts the underside of the cover 144 and urges the cover upwardly. A terminal formed by a threaded stud 156 is so mounted on the multi-purpose actuator lever 66 by an insulating bushing 154 as to be exposed on the upper side but to be normally spaced from the cover 144. A dry cell battery 160 and an alarm 162, such as a buzzer, are housed within the opening of the lever 66 by means of an insulating washer 158. One terminal of the battery 160 is connected to the stud 156 by a contact 164 and the other terminal of the battery is connected to the alarm 162 and thence to the cover 144. When the cover 144 is pressed down into contact with the stud 156 against force of the compression spring 146, the circuit is closed to energize the alarm 162.

On the top wall 22 of the assembly base board 20 is provided a mirror 172 that is mounted by a fixture 174. The mirror is provided to make sure that a cylindrical portion 168 (FIGS. 8 and 9) of a connection terminal 166 mounted between the lower and upper dies 34 and 48 is not in disalignment with a core wire 170 at an end of an insulated or coated electric wire 118 positioned in the grooves 88 and 116 when viewed along the length of the apparatus.

Apparatus according to the above described embodiment of the present invention operates as follows. To tightly fasten the cylindrical portion 168 of the connection terminal 166 having a connection portion such as a washer or ring 176 to an end portion of a coated or insulated wire 118, the actuator lever 66 is first raised as shown in FIG. 3. The return springs 50 move the upper die 48 apart from the lower die 34. While the insert lever 72 is raised by the torsion coil spring 124, the movable pin 132 is at the upper ends of the elongated grooves 130 and is in contact with the slot 62, which represents a stop position.

The cylindrical portion 168 of a connection terminal 166 is positioned in the groove 46 in the lower die 34 (see FIG. 4) with the ring 176 held down substantially in a horizontal plane and extending forwardly. When the multi-purpose actuator lever 66 is turned forwardly or counterclockwise and the upper die 48 is moved down, the projection 54 of the upper die is brought into contact with the cylindrical portion 168 and the spit 56 is pressed against the portion 168, so that the connection terminal 166 is held tightly between the upper and lower dies.

The coated wire 118 is positioned between the lower wire holder 86 of the insert slider 80 and the upper wire holder 110 of the rotary holder 112. The wire is located within the grooves 88 and 116 such that the forward end of the wire comes into contact with the open end of the cylindrical portion 168 of the connection terminal 166. Adjustments may be required at this time by looking through the mirror 172 to make sure that the core wire 170 falls within the range of the hole in the cylindrical portion 168 of the connection terminal. Sometimes the core wire 170 is deflected in the insulation coating 178 of the coated wire 118 or it may be deformed due to a break in the electric wire during manufacture. Such adjustments are possible because the two wire holders 86 and 110 are open and the passage for the electric wire formed by the grooves 88 and 116 is of a size slightly greater than the outer diameter of the coating 178 of the electric wire under these circumstances.

Upon completion of the above preparation the insert lever 72 is turned downwardly by pressing the pressure portion 126. With the described arrangement, the upper holder 112 is pivoted downwardly on the insert slider 80 in a first phase so that the electric wire 118 is sandwiched between the grooves 88 and 116. The upper holder 112 and the insert slider 80 then move toward the dies 34 and 48 in second phase, forcedly thrusting the end portion of the electric wire 118 toward the cylindrical portion 168 of the connection terminal. The core wire 170 is aligned with the hole in the cylindrical portion 168 and the diameter of the core wire 170 approximately equals the size of the hole. As a result, only the core wire 170 enters into the hole or opening in the cylindrical portion 168 as seen from FIG. 5, while the tubular coating 178 is inhibited from advancing into the hole and is compressed by the cylindrical portion 168.

The cover 144 is then strongly pressed down so as to pivot the multi-purpose actuator lever 66 downwardly, and the upper die 48 is forcedly moved down. When this occurs, the cylindrical portion 168 containing the core wire 170 therein is strongly pressed and crimped between the upper and lower dies 48, 34, whereupon the cylindrical portion 168 is tightly fastened to the core wire 170. The result is a permanent integral coupling of the connection terminal 166 to the end portion of the electric wire 118. The alarm means 144 to 164 is designed to provide an alarm upon the application of a predetermined amount of pressure to the multi-purpose actuator lever 66, indicating that the cylindrical portion 168 has been completely crimped to the core wire.

The insert slider 80 and the holder 112 are not opened nor returned together with the electric wire 118 even though the insert lever 72 is released during the situation where the coating 178 is compressed during the fastening of the wire to the cylindrical portion. This is because the insert slider 80 is held against the actuator base board 24 by the compression spring 108, and the movable pin 132 is located within the horizontal slots 64 formed in the side plates of the actuator base board 24. This prevents the holder 112 from moving upwardly in response to upwardly-acting force, together with the frictional resistance acting between these components.

The electric wire 118 having the connection terminal 166 fixed thereto is removed by turning the multi-purpose actuator lever 66 upwardly and pulling backwardly on the electric wire. If the lever 66 is raised subsequent to the crimping of the cylindrical portion 168, then the top die 48 is released and returned upwardly.

Figure 6:
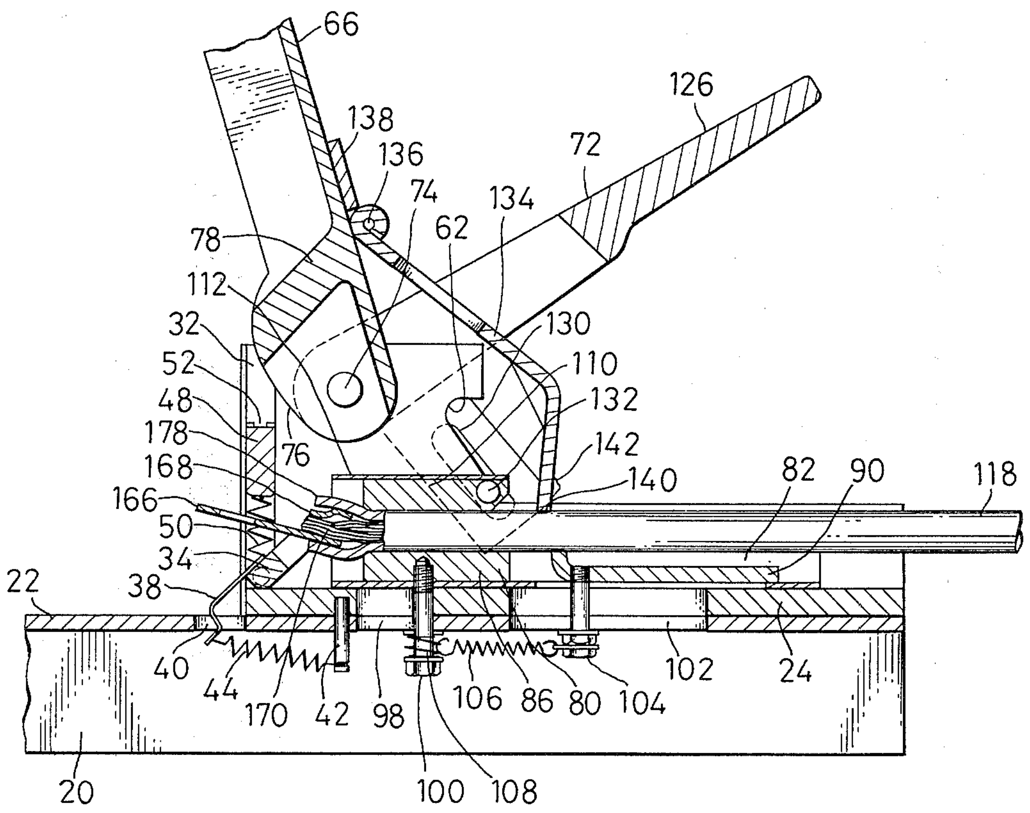
Figure 7:
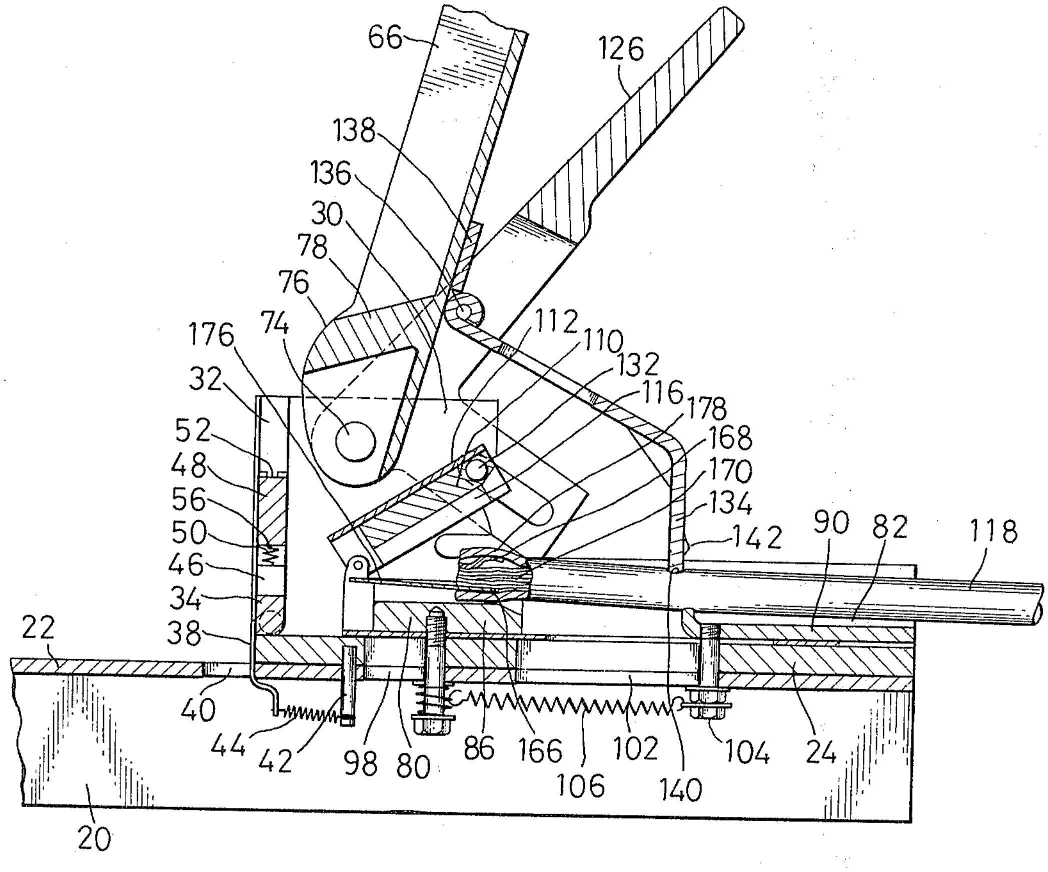

The removal of the electric wire is effected in association with actuation of the lever 66 in the above illustrated embodiments, though it may be manually conducted. While the lever 66 is raised in second phase, the attached pressure arm 134 inclines somewhat backwardly with respect to the perpendicular direction and comes into contact with the back of the electric wire 118. The forward wire groove 140 cooperates with the wire groove 96 in the return slider 90 to hold the electric wire 118 therebetween as shown in FIGS. 6 and 7.

Should the multi-purpose actuator lever 66 be further raised, the slide pin 142 slides on the top edge of the side walls 28 of the actuator base board 24 in a third phase of the operation, and at the same time the return slider 90 moves rearwardly while holding the electric wire 118 with respect to the pressure arm 134. Furthermore, the insert slider 80 and the holder 112 move rearwardly by means of the electric wire 118 and the spring 106, permitting the lower die 34 to be rotated backwardly (FIG. 6) against the force of the return spring 44, and the connection terminal 166 at the end of the electric wire 118 move backwardly out of the dies.

The fourth phase takes place after the return process in third phase. The upper holder 112 pivots under influence of the torsion coil spring 124 and moves away from the insert slider 80 (see FIG. 7). The electric wire 118 is dislodged from both the upper holder 112 and the insert slider 80 because the openings in the wire receiving grooves 88 and 116 have a size that is slightly greater than the electric wire. Then both components return to the standby or stop positions. As the electric wire 118 moves out of the openings in the wire-receiving grooves 88 and 116, it is still gripped by the pressure arm 134, and the previously compressed coating 178 adjacent the terminal 166 slides over the cylindrical portion 168 of the terminal as it is restored from its compressed state, and it covers the cylindrical portion. The connection terminal 166, at the same time, moves away from the dies and the lower die 34 returns to its home or normal position by the action of the spring 44. When this occurs, it is possible to provide a sound indicative of the completion (shown in FIG. 7) of the above procedures.

Thereafter, provided that the multi-purpose actuator lever 66 is turned slightly forwardly, the electric wire 118 becomes free from the pressure arm 134 and the return slider 90, thus permitting the backward removal of the electric wire 118 and the connection terminal 166.

Figure 8:
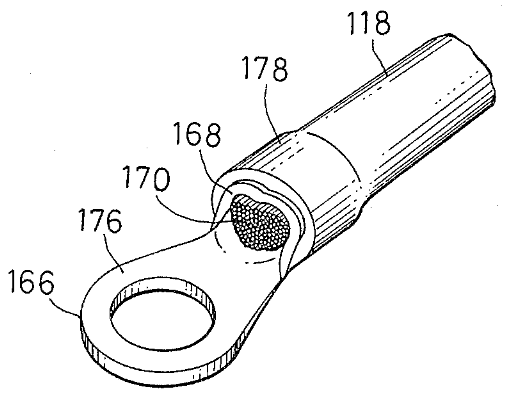
FIG. 8 is a perspective view of an end portion of an electric wire to which a connection terminal is fastened.
Figure 9:
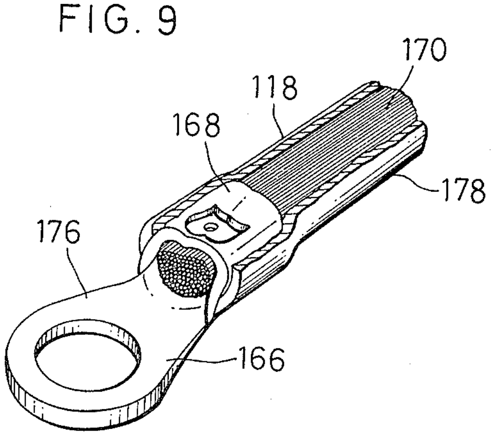
FIG. 9 is a view similar to FIG. 8 but with some parts broken away to show underlying parts.

FIGS. 8 and 9 illustrate the end portion of the electric wire 118 to which the connection terminal 166 has been fixed as described. The cylindrical portion 168 of the connection terminal 166 is concealed from view and insulated by the coating 178, only the washer or ring portion 176 being visible.

As noted earlier, the above described procedure and apparatus in accordance with the present invention enable all of the steps necessary for installation of a wire on a connection terminal to be completed in a continued fashion within a very short period of time (say, several seconds) by inserting the electric wire 118 in the groove 88, and by moving the insert lever 72 and actuating the multi-purpose actuator lever 66 after the connection terminal 166 and the electric wire 118 are positioned for installation. The installation procedure demands no more than a worker. The apparatus may be operated manually as described or automatically by a powered controller which achieves the above steps in a sequential manner.

Figure 10:
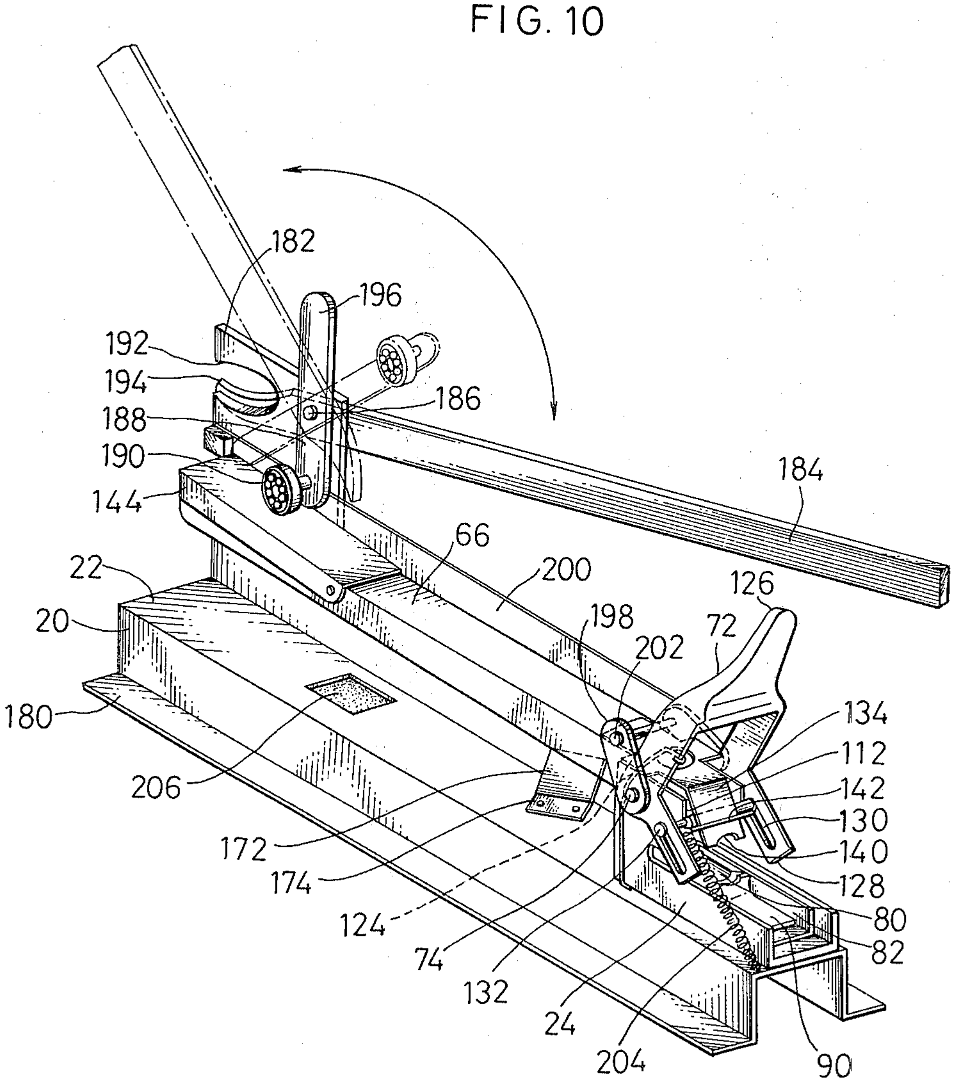
FIG. 10 is a perspective view showing another embodiment of the present invention.

FIG. 10 shows a modification of the present invention, wherein its major components and method of operation are similar to those of the above embodiment, and corresponding parts are designated by the same reference numbers.

To reduce the force necessary for actuation of the multi-purpose actuator lever 66 and to add to the assembly the function of cutting the electric wire, the assembly base board 20 in FIG. 10 is provided at its lower portion with a horizontal flange 180 to insure stability, and an upstanding support plate 182 is fastened to one side of the forward end of the assembly base board 20. A primary lever 184 is pivotally mounted on the support plate 182 on a pivot pin 186. The pivot pin 186 also supports a roller bearing 190 fastened to the end of an arm 188, the bearing 190 being adapted to engage the cover 144 of the multi-purpose actuator lever 66. Both the lever 184 and the arm 188 are secured to the pin 186. A pair of cutter blades 192 and 194 are further formed between the support plate 182 and the primary lever 184. A wire-returning arm 196 is formed at the end of the arm 188 which is opposite from the bearing 190. Further, the rear end of an interlock link 200 is pivotally mounted on the forward end of a middle arm 198 by means of the pin shaft 74. The wire-drawing pressure arm 134 is pivotally installed on the pin 202, and the forward end of the interlock link 200 is guided to the support plate 182 so as to be slidable along its length. When the position of the primary lever 184 is reversed as depicted by the dash-dot line, the return arm 196 swings and abuts the forward end of the interlock link 200 for the purpose of removing the electric wire after a connection has been made. A spring 204 is provided between the movable pin 132 and the assembly base board 20 to enable easy manipulation. An oil-impregnated porous pot 206 is mounted on the assembly base board 20 so that oil may be applied to the end portion of the cylindrical portion 168 of the connection terminal 166, to insure smooth insertion.

It is obvious that many changes and modifications are possible in the present invention, as is evident from the second embodiment. Such changes and modifications which do not depart from the spirit and scope of the present invention as claimed below, should be considered as falling within the scope of the present invention. For example, although in the foregoing the assembly has been described as having the return means 90, 134, the electric wire may be withdrawn as it is after the cylindrical portion 168 of the connection terminal 166 has been fastened to the core wire in the event that no insulation is required about the core wire 170, or the coating is made of a material other than rubber and is never touched by any component during the return process.

What is claimed is:

1. A method of fastening a connection terminal to the forward end of a coated wire, the terminal having a tubular cylindrical part and the wire having an insulating coating over a core wire, the hole in said tubular cylindrical part having substantially the same diameter as said core wire, comprising the steps of tightly clamping the connection terminal;

positioning the forward end of the coated wire substantially in alignment with an open end of the cylindrical part of said connection terminal;

gripping said coated wire and advancing said coated wire toward said connection terminal to force the forward end of said core wire into the cylindrical part of said connection terminal while the forward end of said coating simultaneously engages the cylindrical part and is pushed back by the cylindrical part and bulged out and thereby exposing the forward end of the core wire;

crimping said cylindrical part of the connection terminal onto said exposed end of said core wire;

releasing said connection terminal;

releasing said grip on said coated wire to such an extent that said coated wire can be retracted;

retracting said coated wire while simultaneously engaging the bulged out coating; and pushing the coating over said cylindrical part.

2. Apparatus for attaching a connection terminal to one end of a coated wire, the terminal having a tubular cylindrical part and the coated wire having an insulating coating over a core wire, the hole in the cylindrical part having substantially the same diameter as said core wire, comprising support means, die means on said support means for gripping and crimping said cylindrical part of said connection terminal, insert means slidable on said support means for gripping said coated wire and thrusting an end portion of said coated wire in the direction which is toward said cylindrical part of the connection terminal and thereby inserting said core wire into said cylindrical part, a lever connected to said die means and pivotable to a first location for effecting said gripping and crimping of said cylindrical part, return means on said support means connected to said lever and engagable with said coated wire for moving said coated wire in the direction which is opposite said first mentioned direction when said lever is pivoted to a second location.

3. Apparatus according to claim 2, and further comprising alarm means operatively connected to said die means for providing an alarm when pressure applied to said die means by said lever reaches a predetermined value.

4. Apparatus according to claim 2, and further comprising a mirror positioned to permit viewing of said cylindrical portion of the connection terminal when held by said die means.

5. Apparatus for attaching a connection terminal to one end of a coated wire, the terminal having a tubular cylindrical part and the coated wire having an insulating coating over a core wire, the hole in the cylindrical part having substantially the same diameter as said core wire, comprising support means, die means on said support means for gripping and crimping said cylindrical part of said connection terminal, insert means slidable on said support means for gripping said coated wire and thrusting an end portion of said coated wire in the direction which is toward said cylindrical part of the connection terminal and thereby inserting said core wire into said cylindrical part, return means on said support means for moving said coated wire and said connection termianl in the opposite direction that is generally opposite said previously mentioned direction said insert means including a pair of slidable holders for gripping said coated wire from opposite sides, and further including an insert lever and a multi-purpose actuator lever, said pair of holders being connected to said insert lever for actuation thereby, and said die means and said wire return means being connected to and actuated by said multi-purpose actuator lever.

6. Apparatus according to claim 5, and further comprising restoring means for increasing the spacing between said holders of said insert means when said coated wire is released thereby permitting the restoring of said compressed coating as the coated wire travels through the spacing between the holders during the returning movement.

7. Apparatus according to claim 5, wherein said slidable holders comprises an insert slider and a holder pivoted on an upper portion of one end of said insert slider, and a movable pin connected to the other end of said insert slider and to an elongated groove in said insert lever for pivoting said holder on said slider.

8. Apparatus for attaching a connection terminal to one end of a coated wire, the terminal having a tubular cylindrical part and the coated wire having an insulating coating over a core wire, the hole in the cylindrical part having substantially the same diameter as said core wire, comprising support means, die means on said support means for gripping and crimping said cylindrical part of said connection terminal, insert means slidable on said support means for gripping said coated wire and thrusting an end portion of said coated wire in the direction which is toward said cylindrical part of the connection terminal and thereby inserting said core wire into said cylindrical part, return means on said support means for moving said coated wire and said connection terminal in the opposite direction that is generally opposite said previously mentioned direction, said return means comprising a return slider, a pressure arm, and a multi-purpose actuator lever pivotally connected to said pressure arm.

9. Apparatus according to claim 8 wherein said insert means is interconnected with said return slider by a tension spring.

10. Apparatus for fastening an end portion of an insulated wire to a terminal, said insulated wire including a core wire surrounded by an insulation and said fastening being accomplished without removing the insulation from the end portion of the core wire, the terminal having a tubular connection part and the diameter of the core wire being substantially equal to the diameter of the hole in the tubular connection part, comprising (a) base means;

(b) die means movably mounted on said base means and adapted to receive said tubular connection part therebetween;

(c) actuator means connected to said die means for moving said die means together to hold and to crimp said connection part;

(d) insert means movably mounted on said base means for holding the insulated wire substantially aligned with the open end of the hole in said connection part; and (e) lever means coupled to said base means and to said insert means for moving said insert means toward said die means and thereby forcing said core wire into said hold in said connection part, the insulation engaging the end of said connection part and being compressed back, after which said actuator means is operated to move said die means and to crimp said connection part.

11. Apparatus according to claim 10, wherein said insert means comprises a pair of wire holders, said lever means being movable in first and second phases, in said first phase said wire holders being moved together to grip said insulated wire and in said second phase said wire holders and said insulated wire being moved toward said die means and said connection part.

12. Apparatus according to claim 10, wherein said actuator means comprises a lever pivotally mounted on said base means and operable to engage said die means when pivoted in one direction, and further including wire return means attached to said lever and adapted to engage said wire and move said wire away from said die means when pivoted in the opposite direction.

* * * * *